United States Patent Office 2,786,853
Patented Mar. 26, 1957

2,786,853

3,4-DIHYDRO-2H-PYRAN-2-yl-ACYLOXYACETO-NITRILES AND PROCESS FOR THEIR PREPARATION

Harry A. Stansbury, Jr., South Charleston, and Howard R. Guest, Charleston, W. Va., assignors to Union Carbide and Carbon Corporation, a corporation of New York No Drawing. Application August 31, 1954, Serial No. 453,431

10 Claims. (Cl. 260—345.8)

This invention relates to new chemical compounds and to a process for their preparation. More particularly, the present invention relates to 3,4-dihydro-2H-pyran-2-yl-acyloxyacetonitriles and to a process for their preparation.

The compounds to which the present invention relates can be represented by the following general formula:

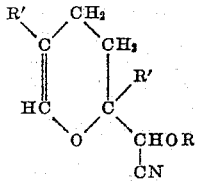

wherein R is an acyl group containing from two to ten carbon atoms and R' is a member selected from the class consisting of hydrogen and methyl radicals.

Representative examples of these novel compounds are 3,4 - dihydro - 2H - pyran - 2 - yl - acetyloxyacetonitrile; 3,4 - dihydro - 2,5 - dimethyl - 2H - pyran - 2 - yl - acetyloxyacetonitrile; 3,4 - dihydro - 2H - pyran - 2 - yl - propionoyloxyacetonitrile; 3,4 - dihydro - 2,5 - dimethyl - 2H-pyran - 2 - yl - propionoyloxyacetonitrile; 3,4-dihydro-2H - pyran - 2 - yl - butyroyloxyacetonitrile; 3,4 - dihydro - 2,5 - dimethyl - 2H - pyran - 2 - yl - butyroyloxyacetonitrile; 3,4 - dihydro - 2H - pyran - 2 - yl - valeroyloxyacetonitrile; 3,4 - dihydro - 2,5 - dimethyl - 2H - pyran - 2 - yl - valeroyloxyacetonitrile; 3,4 - dihydro - 2 H-pyran - 2 - yl - caproyloxyacetonitrile; 3,4 - dihydro - 2,5 - dimethyl - 2H - pyran - 2 - yl - caproyloxyacetonitrile; 3,4 - dihydro - 2H - pyran - 2 - yl - heptanoyloxyacetonitrile; 3,4 - dihydro - 2,5 - dimethyl - 2H - pyran - 2 - yl - heptanoyloxyacetonitrile; 3,4 - dihydro - 2H - pyran - 2 - yl - octanoyloxyacetonitrile; 3,4 - dihydro - 2,5 - dimethyl - 2H - pyran - 2 - yl - octanoyloxyacetonitrile; 3,4 - dihydro - 2H - pyran - 2 - yl - nonanoyloxyacetonitrile; 3,4 - dihydro - 2,5 - dimethyl - 2H - pyran - 2 - yl - nonanoyloxyacetonitrile; 3,4 - dihydro - 2H - pyran - 2 - yl - decanoyloxyacetonitrile; and 3,4 - dihydro - 2,5 - dimethyl - 2H - pyran - 2 - yl - decanoyloxyacetonitrile.

The compounds of this invention can be prepared by reacting acrolein dimer (3,4 - dihydro - 2 - formyl - 2H-pyran) or methacrolein dimer (3,4 - dihydro - 2,5 - dimethyl - 2 - formyl - 2H - pyran) with hydrogen cyanide to form the corresponding cyanohydrin and reacting the resulting mixture with the anhydride of an organic acid having from two to ten carbon atoms in the molecule.

Acrolein and methacrolein readily form the corresponding dimers when heated in the liquid phase in the presence of polymerization inhibitors. To form the compounds of this invention, acrolein dimer or methacrolein dimer is contacted in a reactor with at least an equimolar amount of hydrogen cyanide at a temperature of from about −10° C. to about 100° C. and preferably from about 0° C. to about 30° C. for a period of from about 10 minutes to about 300 minutes. Although the reaction may be conducted at a pressure of from about 5 p. s. i. a. to about 150 p. s. i. a., atmospheric pressure is preferred. The reaction may be conducted in the presence of a weakly alkaline catalyst, such as potassium cyanide or pyridine, which catalyzes the addition of hydrogen cyanide to the carbonyl group. The crude reaction mixture is then contacted with an anhydride of a $C_2$-$C_{10}$ organic acid in at least half the amount (on a mole basis) of dimer originally charged to the reactor. This reaction is conducted at a temperature of from about 50° C. to about 170° C. for a period of from about 10 minutes to about 300 minutes. The resulting 3,4 - dihydro - 2H - pyran - 2 - yl-acyloxyacetonitrile can then be recovered by distillation of the mixture under reduced pressure.

The following equations represent the probable mechanism of the reaction:

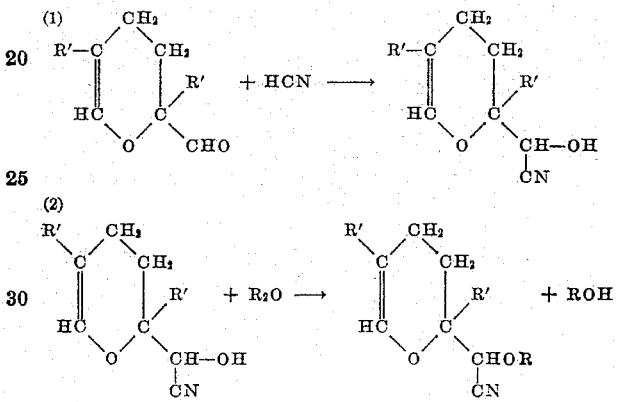

wherein R is an acyl group containing from two to ten carbon atoms and R' is a member selected from the group consisting of hydrogen and methyl radicals.

The following examples are illustrative:

EXAMPLE I

A mixture of 30 gms. of hydrogen cyanide (1.1 moles) and 1 cc. of pyridine catalyst was stirred at −2° to +6° C. while 112 gms. of acrolein dimer (1 mole) was fed over a period of 20 minutes. The reaction mixture was fed to 204 gms. of acetic anhydride (2 moles) while stirring at 110°–120° C. The addition required 25 minutes. The solution was distilled under reduced pressure to obtain 3,4 - dihydro - 2H - pyran - 2 - yl - acetyloxyacetonitrile having these properties: boiling range of 90°–95° C. at 2 mm. Hg, $n_D^{30}$ of 1.4616, specific gravity of 1.143 (20°/20° C.), 92.4% purity by analytical bromination, 7.9% N by the Dumas method (theory 7.7% N). The yield of this colorless, mobile compound was 91% based on acrolein dimer.

A mixture of 59.5 parts by weight of a high molecular weight copolymer (comprising 97 weight percent vinyl chloride and 3 weight percent vinyl acetate), 40 parts of 3,4 - dihydro - 2H - pyran - 2 - yl - acetyloxyacetonitrile and 0.5 part of a resin stabilizer comprising, dibutyl tin maleate, was milled at 158° C. The resulting plasticized sheet was clear and flexible. There was no evidence of "sweat out" after ten days.

EXAMPLE II

A mixture of 30 gms. of hydrogen cyanide (1.1 moles) and 1 cc. of pyridine catalyst was stirred at 20°–26° C. while 140 gms. of methacrolein dimer (1 mole) were added over a period of 40 minutes. The crude mixture was fed to 204 gms. of acetic anhydride (2 moles) while stirring at 108°–111° C. The addition required 25 minutes. Distillation of the mixture under reduced pressure gave the 3,4-dihydro-2,5-dimethyl-2H-pyran-2-yl-acetyloxyacetonitrile having these properties: boiling range 100°–105° C. at 2 mm. Hg, $n_D^{30}$ of 1.4600, specific gravity of 1.084 (20°/20° C.) 99.8% purity by analytical bromination, 7.1% N by the Dumas method (theory 6.7%). The yield of this mobile, coloroless cyanohydrin acetate was 97 percent based on methacrolein dimer.

A mixture of 59.5 parts by weight of a high molecular weight copolymer (comprising 97 weight percent vinyl chloride and 3 weight percent vinyl acetate), 40 parts of 3,4-dihydro-2,5-dimethyl-2H-pyran-2-yl-acetyloxyacetonitrile and 0.5 part of a resin stabilizer, comprising dibutyl tin maleate, was milled at 158° C. The resulting clear, flexible sheet showed no evidence of "sweat out" after ten days.

EXAMPLE III

A solution of 2 cc. of pyridine catalyst in 60 gms. of hydrogen cyanide (2.2 moles) was stirred at 0° to 5° C. while 224 gms. of acrolein dimer (2 moles) were fed over a period of 30 minutes. The crude cyanohydrin was immediately fed to 810 gms. of 2-ethylhexanoic anhydride (3 moles) while stirring at 125° C. The addition required 10 minutes. The reaction mixture was distilled under reduced pressure to obtain fractions which were mixtures of 2-ethylhexanoic anhydride and the desired 3,4 - dihydro - 2H - pyran - 2 - yl - (2 - ethylhexanoyloxy)acetonitrile. Because of the proximity of the boiling points, it was difficult to separate these two components by fractionation. Therefore the distilled mixtures were combined and refluxed with a 100 percent molar excess of ethanol over the contained 2-ethylhexanoic anhydride. The kettle temperature was 196° C. at the end of the 10 minute reflux period. The following reaction occurred.

$$(C_4H_9\overset{C_2H_5}{\underset{|}{C}}HCO)_2O + C_2H_5OH \longrightarrow$$
2-ethylhexanoic anhydride    ethanol

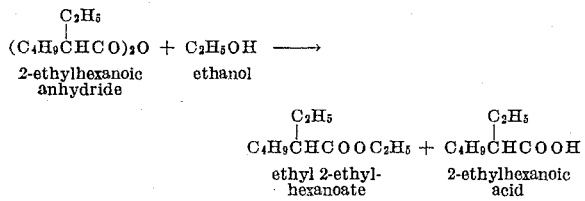

ethyl 2-ethyl-hexanoate    2-ethylhexanoic acid

The lower boiling ethyl 2-ethylhexanoate and 2-ethylhexanoic acid were easily separated from the desired product by simple fractionation. The refined 3,4-dihydro - 2H - pyran - 2 - yl - (2 - ethylhexanoyloxy)acetonitrile, which was isolated with 50 percent yield based on the dimer, had the properties recorded in Table I.

Table 1.—3,4 - dihydro - 2H - pyran - 2 - yl - (2 - ethylhexanoyloxy)acetonitrile

| | Mol. Wt. | Percent C | Percent H | Percent N | Gms. per Double Bond | Boiling Point at 1 mm., °C. | Sp. G. 20/20° | $n_D^{30}$ |
|---|---|---|---|---|---|---|---|---|
| Observed | [1] 260 | 66.7 | 8.5 | 5.4 | [2] 303 | 127 | 1.014 | 1.4548 |
| Theory | 265 | 67.9 | 8.7 | 5.3 | 265 | | | |

[1] Determined by the Menzies-Wright method.
[2] Determined by analytical bromination.

A mixture of 59.5 parts by weight of a high molecular weight copolymer (comprising 97 weight percent vinyl chloride and 3 weight percent vinyl acetate), 40 parts of 3,4-dihydro-2H-pyran-2-yl-(2-ethylhexanoyloxy)acetonitrile and 0.5 part of a resin stabilizer, comprising dibutyl tin maleate, were milled for 5 minutes at 158° C. The resulting plasticized sheet was clear, flexible and showed no evidence of "sweat out."

EXAMPLE IV

A solution of 2 cc. of pyridine catalyst in 60 gms. of hydrogen cyanide (2.2 moles) was stirred at 20°–23° C. while 280 gms. of methacrolein dimer (2 moles) were fed over a period of 30 minutes. The crude cyanohydrin was fed at once to 810 gms. of 2-ethylhexanoic anhydride (3 moles) while stirring at 120°–123° C. The addition required 35 minutes. The crude reaction mixture was distilled under reduced pressure to find that the desired ester was difficult to separate from the excess 2-ethylhexanoic anhydride by fractionation. Therefore, the distilled mixtures were combined and refluxed with a 100 percent molar excess of ethanol over the contained 2-ethylhexanoic anhydride. The final kettle temperature was 170° C. at the end of the 10 minute reflux period. As illustrated in Example III, the ethanol reacted with all of the 2-ethylhexanoic anhydride. Simple fractionation of the solution afforded pure 3,4-dihydro-2,5 - dimethyl - 2H - pyran - 2 - yl(2 - ethylhexanoyloxy)acetonitrile having the properties recorded in Table II. The yield of refined product was 55 percent based on methacrolein dimer.

Table II.—3,4-dihydro-2,5-dimethyl-2H-pyran-2-yl(2-ethylhexanoyloxy)acetonitrile

| | Mol. Wt. | Percent C | Percent H | Percent N | Gms. per Double Bond | Boiling Point at 1 mm., °C. | Sp. G. 20/20° | $n_D^{30}$ |
|---|---|---|---|---|---|---|---|---|
| Observed | [1] 299 | 69.6 | 9.2 | 4.8 | [2] 317 | 128 | 0.990 | 1.4545 |
| Theory | 293 | 68.9 | 9.3 | 4.8 | 299 | | | |

[1] Determined by the Menzies-Wright method.
[2] Determined by analytical bromination.

A mixture of 59.5 parts by weight of a high molecular weight copolymer (comprising 97 weight percent vinyl chloride and 3 weight percent vinyl acetate), 40 parts of 3,4 - dihydro - 2,5 - dimethyl - 2H - pyran - 2 - yl(2-ethylhexanoyloxy)acetonitrile and 0.5 part of a resin stabilizer, comprising dibutyl tin maleate, were milled for 5 minutes at 158° C. The resulting plasticized sheet was clear, flexible and showed no evidence of "sweat out."

Our novel compounds are useful as chemical intermediates for the preparation of derived organic compounds. They are valuable as plasticizers for certain synthetic organic resins and are of particular value as plasticizers for vinyl chloride-vinyl acetate copolymers and vinyl chloride-acrylonitrile copolymers.

This application is a continuation-in-part of our copending application Serial No. 429,376, filed May 12, 1954, wherein the reactions of hydrogen cyanide with acrolein dimer and methacrolein dimer are described.

We claim:

1. A 3,4-dihydro-2H-pyran-2-yl-acyloxyacetonitrile of the general formula:

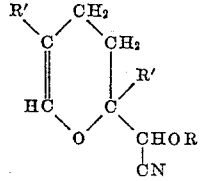

wherein R is a saturated aliphatic acyl radical containing from two to ten carbon atoms and R' is a member selected from the class consisting of hydrogen and methyl radicals.

2. A 3,4-dihydro-2H-pyran-2-yl-acyloxyacetonitrile of the general formula:

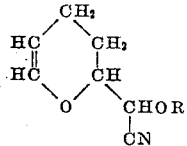

wherein R is a saturated aliphatic acyl radical containing from two to ten carbon atoms.

3. A 3,4-dihydro-2,5-dimethyl-2H-pyran-2-yl-acyloxy-acetonitrile of the general formula:

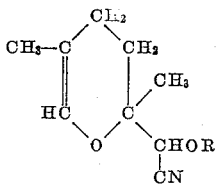

wherein R is a saturated aliphatic acyl radical containing from two to ten carbon atoms.

4. 3,4-dihydro-2H-pyran-2-yl-acetyloxyacetonitrile.

5. 3,4-dihydro-2,5-dimethyl-2H-pyran-2-yl-acetyloxyacetonitrile.

6. 3,4-dihydro-2H-pyran-2-yl(2-ethylhexanoyloxy)acetonitrile.

7. 3,4-dihydro-2,5-dimethyl-2H-pyran-2-yl(2-ethylhexanoyloxy)acetonitrile.

8. The method of preparing a 3,4-dihydro-2H-pyran-2-yl-acyloxyacetonitrile of the general formula:

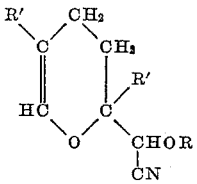

wherein R is a saturated aliphatic acyl radical containing from two to ten carbon atoms and R' is a member selected from the class consisting of hydrogen and methyl radicals, which comprises heating at a temperature of from about −10° C. to about 100° C. a compound selected from the class consisting of acrolein dimer and methacrolein dimer with hydrogen cyanide and heating at a temperature of from about 50° C. to about 170° C. the resulting product with the anhydride of an acid having from two to ten carbon atoms in the molecule.

9. The method of preparing a 3,4-dihydro-2H-pyran-2-yl-acyloxyacetonitrile of the general formula:

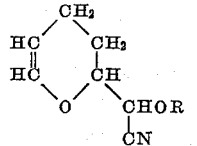

wherein R is a saturated aliphatic acyl radical containing from two to ten carbon atoms, which comprises heating at a temperature of from about −10° C. to about 100° C. acrolein dimer with hydrogen cyanide and heating at a temperature of from about 50° C. to about 170° C. the resulting product with the anhydride of a saturated aliphatic acid having from two to ten carbon atoms in the molecule.

10. The method of preparing a 3,4-dihydro-2,5-dimethyl-2H-pyran-2-yl-acyloxyacetonitrile of the general formula:

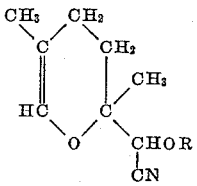

wherein R is a saturated aliphatic acyl radical containing from two to ten carbon atoms, which comprises heating at a temperature of from about −10° C. to about 100° C. methacrolein dimer with hydrogen cyanide and heating at a temperature of from about 50° C. to about 170° C. the resulting product with the anhydride of a saturated aliphatic acid having from two to ten carbon atoms in the molecule.

References Cited in the file of this patent

UNITED STATES PATENTS

| | | |
|---|---|---|
| Re. 23,345 | Smith | Feb. 27, 1951 |
| 2,511,891 | Whetstone | June 20, 1950 |
| 2,537,921 | Smith | Jan. 9, 1951 |
| 2,576,323 | Whetstone | Nov. 27, 1951 |

OTHER REFERENCES

Aloy et al.: Bull. Soc. Chim. [4] 13, 457–460 (1913).